United States Patent
Choe (10) Patent No.: US 8,917,098 B2
(45) Date of Patent: Dec. 23, 2014

(54) CONVERTER CIRCUIT AND METHOD OF DRIVING THE SAME

(75) Inventor: Andrew Kunil Choe, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 465 days.

(21) Appl. No.: 13/217,669

(22) Filed: Aug. 25, 2011

(65) Prior Publication Data
US 2013/0015861 A1    Jan. 17, 2013

(30) Foreign Application Priority Data

Jul. 12, 2011  (KR) .......................... 10-2011-0069140

(51) Int. Cl.
*G01R 27/28* (2006.01)
*H04N 5/357* (2011.01)
*H04N 5/378* (2011.01)

(52) U.S. Cl.
CPC ............. *H04N 5/378* (2013.01); *H04N 5/3575* (2013.01)
USPC ....................................................... 324/615

(58) Field of Classification Search
CPC ... H04N 5/357; H04N 5/3575; H04N 5/3577; H04N 5/361; H04N 5/363; H04N 5/365; H04N 5/335; H04N 5/3745; H04N 5/37455; H04N 5/378
USPC ........................... 341/155–172; 348/294–324
See application file for complete search history.

(56) References Cited

U.S. PATENT DOCUMENTS

| | | | |
|---|---|---|---|
| 2005/0206752 A1* | 9/2005 | Lim | 348/241 |
| 2005/0280730 A1* | 12/2005 | Lim et al. | 348/308 |
| 2011/0261177 A1* | 10/2011 | Moore | 348/65 |

FOREIGN PATENT DOCUMENTS

| | | |
|---|---|---|
| EP | 1940030 A2 | 7/2008 |
| KR | 10-2008-0019376 A | 3/2008 |
| KR | 10-0823835 B1 | 4/2008 |
| KR | 10-2010-0004800 A | 1/2010 |
| WO | WO 2008030327 A2 * | 3/2008 |

OTHER PUBLICATIONS

Kawahito, et al., Columm Parallel Signal Processing Techniques for Reducing Thermal and RTS Noises in CMOS Image Sensors, Research Institute of Electronics, Shizuoka University (2007).*

Kawai, N. et al. "Effectiveness of a correlated multiple sampling differential average for reducing 1/f noise" *IEICE Electronics Express*, Jul. 10, 2005, 2(13):379-383.

* cited by examiner

*Primary Examiner* — Melissa Koval
*Assistant Examiner* — Daniel Miller
(74) *Attorney, Agent, or Firm* — Saliwanchik, Lloyd & Eisenschenk (57) ABSTRACT

Provided are a converter circuit and a method of driving the same. The converter circuit includes: an input unit receiving a conversion target signal; a detection unit receiving a conversion target signal for each interval from the input unit, sampling the conversion target signal for each interval according to a plurality of timings to calculate an average value for each interval, and outputting a comparison unit input signal by using the average value for each interval; and a comparison unit comparing the comparison unit input signal with a predetermined reference signal to output a comparison result value.

17 Claims, 5 Drawing Sheets

FIG. 1

(Prior Art)

CONVERTER CIRCUIT AND METHOD OF DRIVING THE SAME

CROSS-REFERENCE TO RELATED APPLICATION

This application claims the benefit under 35 U.S.C. 119 of Korean Patent Application No. 10-2011-0069140, filed on Jul. 12, 2011, which is hereby incorporated by reference in its entirety.

BACKGROUND

The present disclosure relates to a converter circuit and a method of driving the same, and more particularly, to a converter circuit for converting an output value of a sensing device such as a pixel circuit of an image sensor, detecting a different output value for each interval, and reducing noise occurring during the detection operation and a method of driving the same.

In an image sensor, a 4T pixel structure (e.g., a 4-transistor pinned-photodiode pixel) generates two output signals according to temporal timing. One is a reset voltage (i.e., an initial value) of a photo diode and the other is a signal voltage (i.e., a final value of a photo diode). Accordingly, a brightness value of light incident to the image sensor may be measured by detecting a difference between the initial value and the final value.

A related art Correlated Double Sampling (CDS) circuit may effectively measure the brightness value by using a difference between pixel output values. However, the image sensor of the 4T pixel structure is affected by a significant amount of noise, which is added or accumulated on the initial value and the final value. In this case, even when a low-frequency noise is removed through an analog CDS processing, the analog CDS processing may amplify a high-frequency noise.

Since the noise has a negative effect on a dynamic range of a photodiode pixel array, it needs to be reduced.

BRIEF SUMMARY

Embodiments provide a Multiple Sampling Correlated Double Sampling (MSCDS) circuit for effectively removing noise influence by sampling a conversion target signal having noise several times and averaging the sampled signals.

In one embodiment, a converter circuit includes: an input unit receiving a conversion target signal; a detection unit receiving a conversion target signal for each interval from the input unit, sampling the conversion target signal for each interval according to a plurality of timings to calculate an average value for each interval, and outputting a comparison unit input signal by using the average value for each interval; and a comparison unit comparing the comparison unit input signal with a predetermined reference signal to output a comparison result value.

In another embodiment, a method of driving a converter circuit includes: receiving a conversion target signal for each interval from an input unit of the converter circuit; sampling the conversion target signal for each interval according to a plurality of timings; calculating an average value for each interval of the conversion target signal for each interval by using a detected value; inputting a comparison unit input signal generated by the average value for each interval into a comparison unit of the converter circuit; and outputting a comparison result value by comparing the comparison unit input signal and a predetermined reference signal in the comparison unit.

The details of one or more embodiments are set forth in the accompanying drawings and the description below. Other features will be apparent from the description and drawings, and from the claims.

DETAILED DESCRIPTION

Reference will now be made in detail to the embodiments of the present disclosure, examples of which are illustrated in the accompanying drawings.

Figure 1:
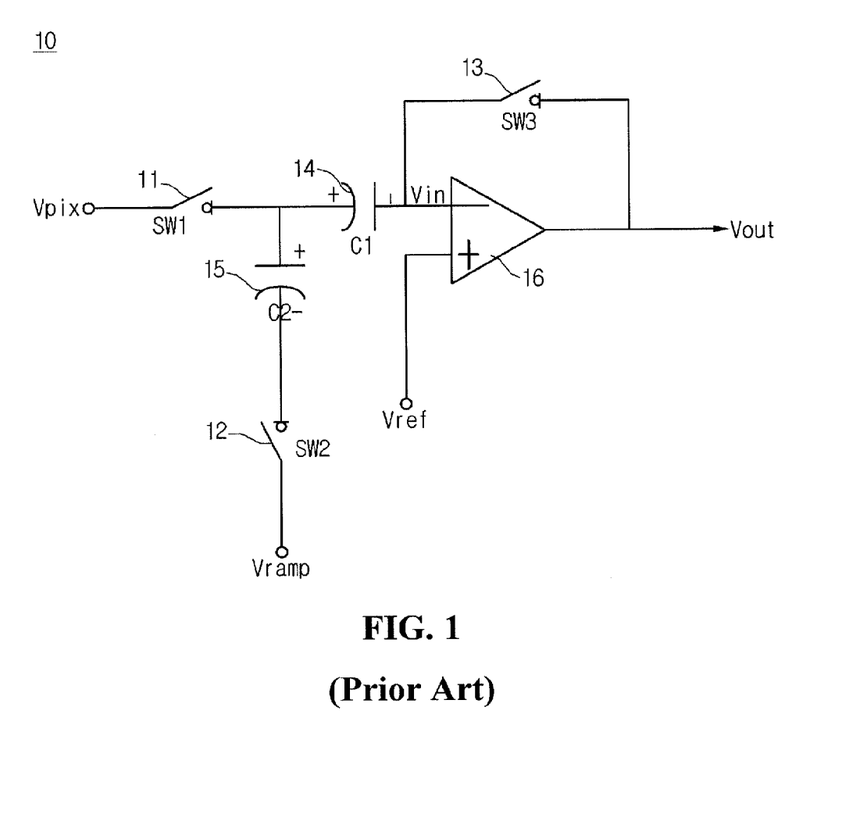
FIG. 1 is a block diagram illustrating a configuration of a converter circuit.

FIG. 1 is a block diagram illustrating a configuration of a converter circuit. FIG. 1 shows a typical single-slope analog to digital converter circuit 10. Referring to FIG. 1, the converter circuit 10 may include switches 11, 12, and 13, capacitors 14 and 15, and a comparator 16. An inputted conversion target signal Vpix is a pixel output signal read out from a pixel of an image sensor.

Moreover, a signal Vpix inputted to a converter is divided into a reset signal Vpix,rst or a signal Vpix,sig according to time. The converter circuit 10 detects the signals Vpix,rst and Vpix,sig through switching operations of the switches 11, 12, and 13 and inputs them into an input terminal Vin of the comparator 16. This will be described in more detail with reference to FIG. 2.

Figure 2:
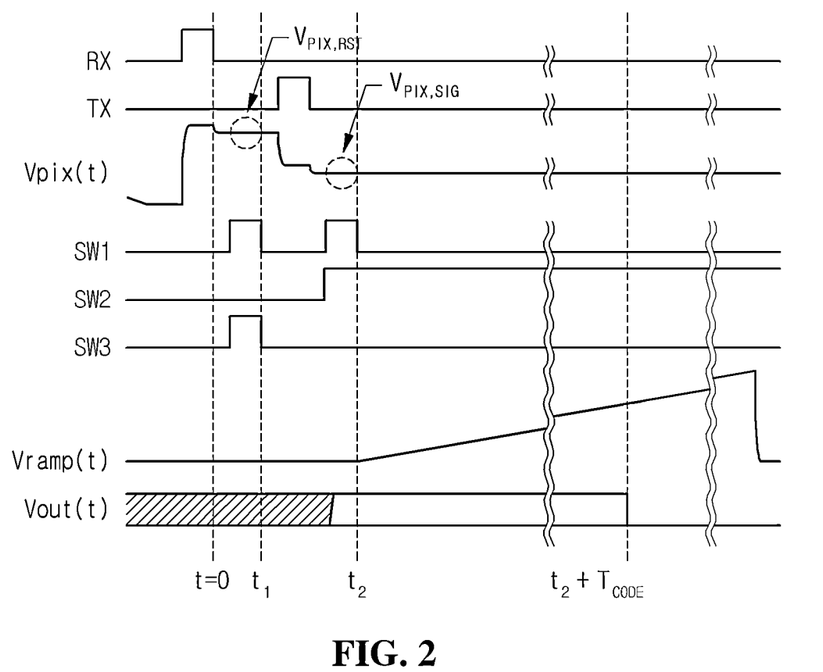
FIG. 2 is a timing diagram of the converter circuit of FIG. 1.

FIG. 2 is a timing diagram of the converter circuit of FIG. 1. In FIG. 2, as shown in FIG. 1, the output signal Vpix(t) of a pixel is inputted to the converter circuit 10 and RX and TX represent operation timings of a reset transistor and a transfer transistor constituting a pixel. Moreover, SW1, SW2, and SW3 represent operation timings of the switches 11, 12, and 13 in FIG. 1. Vramp(t) represents an operation timing of a ramp signal applied to the switch 12 and Vout(t) represents an output signal of the comparator 16 in the converter circuit 10.

Referring to the timing diagram of FIG. 2, when the reset transistor RX is turned off at t=0 shortly after it is turned on, the output signal Vpix(t) of a pixel may be inputted to the converter circuit 10 as a reset voltage. At this point, when the switch 11 and the switch 13 are turned on and, shortly after that, they are turned off at t1, a voltage of the following Equation 1 is applied to the capacitor 14 at t1.

$$V_{C1}(t_1) = V\text{pix}(t_1) - V_{ref} = V\text{pix,rst} - V_{ref}$$ Equation 1

As shown in Equation 1, the output signal Vpix of a pixel may be detected in the capacitor 14 and, in more detail, may be detected with {reset voltage Vpix,rst−reference voltage Vref}. As shown in FIG. 2, since the reset transistor RX of a pixel is turned on before t=0, the pixel output voltage Vpix at t1 may be the reset voltage Vpix,rst. Later, when the transfer transistor TX of a pixel is turned on at an interval t1-t2, the output voltage Vpix of a pixel is changed into a signal voltage value Vpix,sig. After the output voltage Vpix is changed into the signal voltage value Vpix,sig, the signal voltage value Vpix,sig may be detected by turning on the switches 11 and 12.

A voltage Vc2 applied to the capacitor 15 right after the switch 11 and the switch 12 are turned off at t2 is expressed as the following Equation 2.

$$V_{c2}(t2)=V\text{pix}(t2)-V\text{ramp}(t2)=V\text{pix,sig}-V\text{ramp0} \quad \text{Equation 2}$$

Here, since the ramp signal Vramp is inputted with a uniform value as Vramp0 at t<t2 as shown in Equation 3, a voltage value Vc2 applied to the capacitor 15 at t2 may be determined by the signal voltage value Vpix,sig of a pixel.

$$V\text{ramp}(t) = \begin{cases} V\text{ramp0} & t < t2 \\ V\text{ramp0} + m_{ramp}(t-t2) & t = > t2 \end{cases} \quad \text{Equation 3}$$

Vramp0 represents an initial value of the lamp signal and $m_{ramp}$ represents a slope value of the lamp signal and voltage/time (V/s) may be a unit. Accordingly, the input terminal voltage Vin of the comparator 16 at t2+Tcode of FIG. 2 may be measured as the following Equation 4 using Equation 1 to Equation 3.

$$V\text{in}(t2+T\text{code})=V\text{ramp}(t2+T\text{code})+Vc2(t2)-Vc1(t1)$$

$$=m_{ramp}*T\text{code}+V\text{pix,sig}-V\text{pix,rst}+V\text{ref} \quad \text{Equation 4}$$

Furthermore, when the input terminal voltage Vin becomes identical to the reference voltage Vref, the comparator 16 is in a trip state to change its output value, so that an interval Tcode of the trip state from t2 may be obtained by the following Equation 5.

$$T\text{code} = \frac{V\text{pix, rst} - V\text{pix, sig}}{m_{ramp}} \quad \text{Equation 5}$$

Accordingly, a digital output of the converter circuit 10 may be obtained by operating a digital counter at every designed period such as Tcode. Additionally, Tcode may be dependable on a signal value inputted to a converter, i.e., Vpix,rst and Vpix,sig. Noise occurring at these values may directly affect a converter output.

Figure 3:
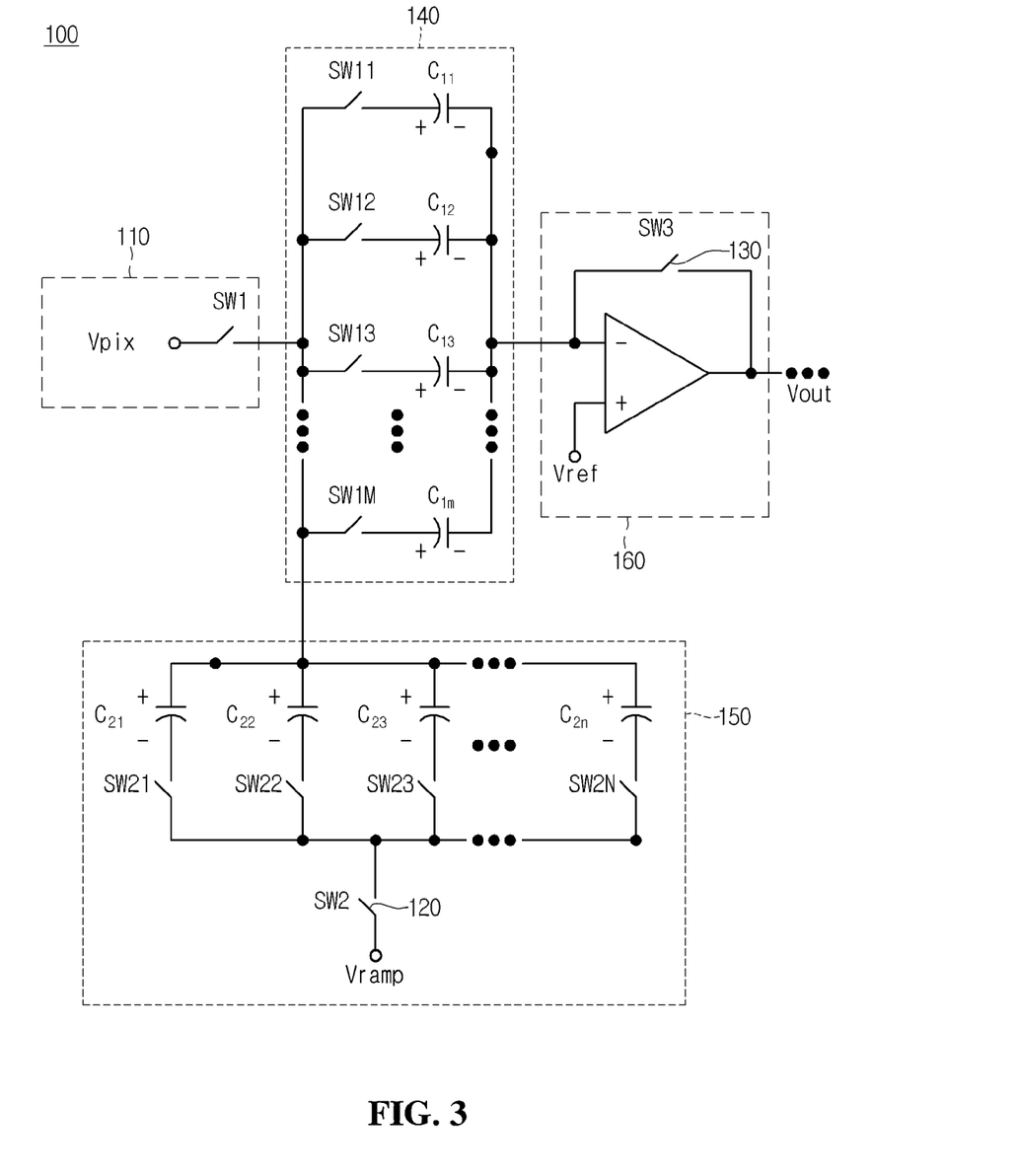
FIG. 3 is a block diagram illustrating a configuration of a converter circuit according to an embodiment.

FIG. 3 is a block diagram illustrating a configuration of a converter circuit according to an embodiment. Referring to FIG. 3, the converter circuit 100 may include an input unit 110, a plurality of charge storage units 140 and 150, and a comparison unit 130. Operations of the converter circuit 100 are described with reference to FIG. 3 when an output signal Vpix of a pixel is inputted to the converter circuit 100. However, besides the output signal of a pixel, the converter circuit 100 of the present invention may be universally applied to any case that an output signal of another device or circuit is converted. For example, the converter circuit 100 of the present invention may be also applied to a case that a conversion target signal is outputted at an interval and an interval signal is detected and converted. Since the output signal Vpix of a pixel is inputted to the converter circuit 100 of the present invention, it may be a conversion target signal.

The input unit 110 may receive the conversion target signal Vpix. The input unit 110 may include a switch SW1 for receiving the conversion target signal Vpix. When the switch SW1 is opened, the conversion target signal Vpix may not be inputted. Only when the switch SW1 is closed, the conversion target signal Vpix may be inputted.

The first charge storage unit 140 and the second charge storage unit 150 may constitute a detection unit of the present invention. As mentioned above, when the conversion target signal Vpix is the output signal of a pixel, it is inputted at a different interval to the input unit 110 and then is detected. The first charge storage unit 140 and the second charge storage unit 150 may separately detect the conversion target signal Vpix for each interval through operations of the switches SW1, SW2, and SW3.

For example, the first charge storage unit 140 may detect the conversion target signal Vpix inputted at the timing when the switches SW1 and SW3 operate. At this point, the conversion target signal Vpix may be a reset output signal Vpix, rst. The first charge storage unit 140 may be located between the input unit 110 or the comparison unit 160.

Additionally, the second charge storage unit 150 may detect the conversion target signal Vpix inputted at the timing when the switches SW1 and SW2 operate. At this point, the conversion target signal Vpix may be a signal output signal Vpix,sig.

Moreover, the second charge storage unit 150 may include a ramp generation unit 120 for generating a ramp signal. An output signal Vout of the comparison unit 160 may be tripped after a predetermined time by applying a ramp signal to a lower end of the second charge storage unit 150.

Additionally, the first charge storage unit 140 and the second charge storage unit 150 include a plurality of charge storage devices C11, C12, C13, and C1M and C21, C22, C23, and C2N and a plurality of switches SW11, SW12, SW13, and SW1M and SW21, SW22, SW23, and SW2N for operating each of the charge storage devices. The first and second charge storage units 140 and 150 may calculate an average value for each interval by using the charge storage devices and the switches.

The charge storage devices C11, C12, C13, and C1M and C21, C22, C23, and C2N may comprise capacitors and the switches SW11, SW12, SW13, and SW1M and SW21, SW22, SW23, and SW2N may comprise switches or relays.

In more detail, the conversion target signal Vpix is sampled several times at an interval for receiving the conversion target signal Vpix for each corresponding interval by sequentially operating the plurality of switches according to a plurality of timings. An average value of the conversion target signals Vpix for corresponding interval, i.e., an average value for each interval, may be calculated by averaging the sampled values. This will be described in detail later.

As a result, the detection unit including the first charge storage unit 140 and the second charge storage unit 150 receive a conversion target signal Vpix and a ramp signal Vramp and perform a switching operation and a predetermined calculation on the signals Vpix and Vramp to output an input signal Vin to an input terminal of the comparison unit 160.

The comparison unit 160 receives the input signal Vin and a predetermined reference signal Vref and compares them to output a result value Vout. The comparison unit 160 may further include a switch SW3. The switch SW3 may operate at an interval while the first charge storage unit 140 detects a conversion target signal Vpix.

Moreover, the converter circuit 100 of FIG. 3 may further include a control unit for driving each of the switches of FIG. 3 for each timing and calculating an average value for each interval and a power supply unit for supplying power to each device. Additionally, the converter circuit 100 may further include a clock generator for counting a result value of the comparison unit 160 after generating a clock at a predetermined period.

Figure 4:
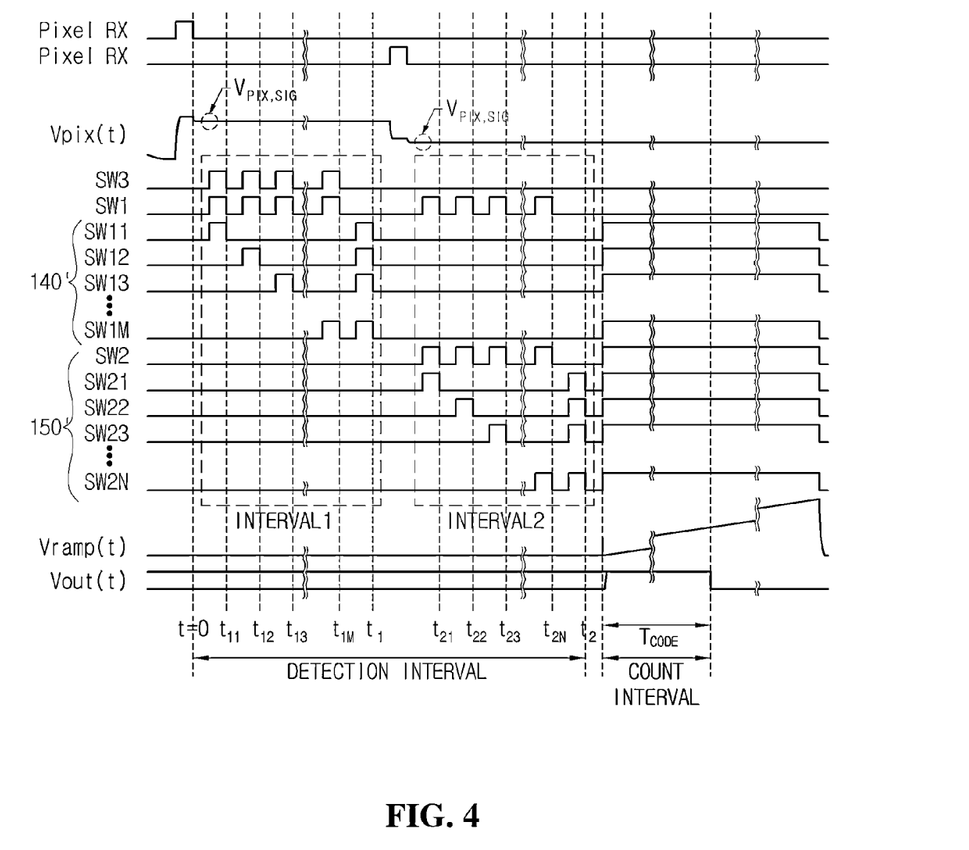
FIG. 4 is a timing diagram of the converter circuit of FIG. 3.

FIG. 4 is a timing diagram of the converter circuit of FIG. 3. Referring to FIG. 4, an output signal Vpix(t) of a pixel is inputted to the converter circuit 100 and Pixel RX and Pixel TX represent operation timings of a reset transistor and a transfer transistor constituting a pixel. Additionally, SW1, SW2 and SW3 represent operations timings of switches SW1, SW2 and SW3. SW11, SW12, SW13, and SW1M represent driving timings 140' of the switches SW11, SW12, SW13, and SW1M constituting the first charge storage unit 140 and SW21, SW22, SW23, and SW2N represent driving timings 150' of the switches SW21, SW22, SW23, and SW2N constituting the second charge storage unit 150.

Referring to FIG. 4, the first charge storage unit 140 detects a conversion target signal Vpix inputted at the interval 1 and calculates an average value of the interval 1. The second charge storage unit 150 detects a conversion target signal Vpix inputted at the interval 2 and calculates an average value of the interval 2. An interval when the first and second charge storage units 140 and 150 detect a signal is called a "detection interval". The detection interval comprises interval 1 and interval 2 as described in FIG. 4.

At the interval 1 tailed after an operation of the reset transistor RX, a reset signal Vpix,rst of a pixel may be inputted as the conversion target signal Vpix. In order to detect the conversion target signal Vpix corresponding to the interval 1, the switch SW1 of the input unit 110 and the switch SW3 of the comparison unit 160 operate together and the plurality of switches SW11, SW12, SW13, and SW1M of the first charge storage unit 140 operate simultaneously. Referring to FIG. 4, since the switches SW11, SW12, and SW13 operate sequentially, the conversion target signal Vpix is detected M-times and the switches SW1 and SW3 operate in synchronization to the timing when the switches SW11, SW12, SW13, and SW1M of the first charge storage unit 140 operate.

Moreover, the operation timings of the switches SW1 and SW3 may be turned on and turned off several times in synchronization to those of the switches SW11, SW12, SW13, and SW1M of the first charge storage unit 140 as shown in FIG. 4, but are not limited thereto. Thus, the switches SW1 and SW3 may operate at least operation timings of the switches SW11, SW12, SW13, and SW1M. For example, the switches SW1 and SW3 may continuously turned on for the interval 1 and may be turned off at the timing 11 when all switches of the first charge storage unit 140 are turned on and turned off.

Likewise, the operation timings of the switches SW1 and SW2 may be turned on and turned off several times in synchronization to those of the switches SW21, SW22, SW23, and SW2N of the second charge storage unit 150. However, the switches SW1 and SW2 may be continuously turned on for the interval 2 and may be turned off at the timing t2 when all the switches of the second charge storage unit are turned on and turned off.

The timing t1 is a point of time when operations of all switches in the first charge storage unit 140 are completed at the interval 1 and may be a point of time when the detection of the conversion target signal Vpix is completed. Also, a voltage of the following Equation 6 may be applied to the each of charge storage devices C11, C12, C13, and C1M.

$$Vc11 = Vpix, rst + vn, pix(t11) - Vref$$ Equation 6

$$Vc12 = Vpix, rst + vn, pix(t12) - Vref$$

...

$$Vc1m = Vpix, rst + vn, pix(t1M) - Vref$$

That is, the conversion target signal Vpix is sampled by the M number of charge storage devices in the first charge storage unit 140 but noise signals $v_{n\_pix}(t11)$, $v_{n\_pix}(t12)$, and $v_{n\_pix}(t1M)$ may be detected together during each sampling. At this point, standard deviation of the noise signal $v_{n\_pix}$ at the timing t1 may be $\sigma_{n\_pix}$.

Moreover, the first charge storage unit 140 may add up signals sampled several times of M and may average them. An average value for interval 1 may be calculated as the following Equation 7.

$$Vc1_{avr} = \frac{1}{M}\sum V_{C1M}$$ Equation 7

$$= Vpix, rst + \frac{1}{M}\sum vn, pix(t1m) - Vref$$

In Equation 7, an average value of the interval 1 measured at the timing t1 includes an average value of the noise signal $V_{n\_pix}$ besides a value obtained by subtracting the reference signal Vref from the conversion target signal value Vpix,rst. Accordingly, if the standard deviation of the noise signal $v_{n\_pix}$ is calculated, the following Equation 8 is obtained from $\sigma_{n\_pix}$.

$$StandardDeviation\left(\frac{1}{M}\sum vn, pix(t1m)\right) = \frac{\sigma n, pix}{\sqrt{M}}$$ Equation 8

Accordingly, it may be reduced by $1/\sqrt{M}$ times than the standard deviation of the typical noise $\sigma_{n\_pix}$.

Moreover, at the interval 2 for detecting a output signal voltage of a pixel, since the conversion target signal Vpix,sig is sampled N-times, an average value for each interval is calculated in the same manner as at the interval 1, and noise in the average value for each interval may be reduced by $1/\sqrt{N}$ times.

Although signals for two intervals are detected in FIG. 4, signals for more than 3 intervals may be also detected. In this case, the detection interval of FIG. 4 may include more than 3 intervals, for example, an interval 1, an interval 2, and an interval 3. In another method, a new detection interval may be placed after the end of the count interval of FIG. 4.

Moreover, the ramp generation unit generates a ramp signal Vramp after the timing t2 when the detection interval ends and, after the generating of the ramp signal Vramp, an interval until the timing when the comparison unit 160 is in a trip state may be a "count interval", i.e., Tcode. The count interval may be an interval right after the timing t2 of the detection interval ends but, as shown in FIG. 4, may be an interval when a predetermined time elapses after the timing t2 of the detection interval ends. That is, the count interval may start simultaneously with or at least later than the detection interval end.

Additionally, the comparison unit 160 may operate in synchronization to the occurring timing of the ramp signal of the ramp generation unit. The comparison unit 160 may output a comparison result by applying a predetermined voltage Vref to a positive terminal.

Figure 5:
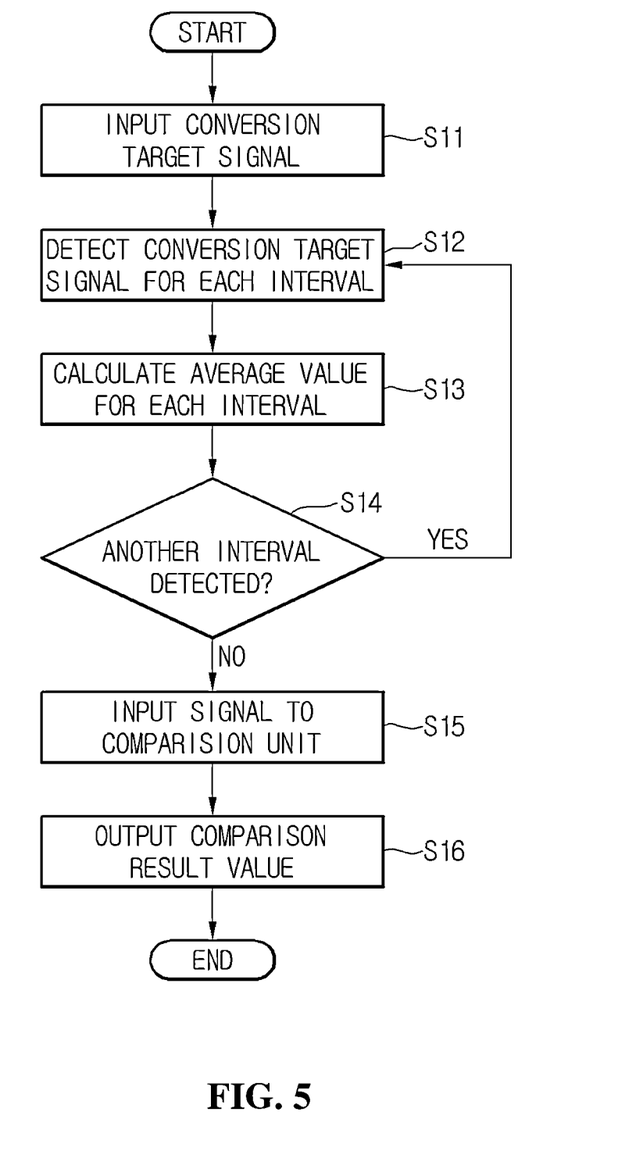
FIG. 5 is a flowchart illustrating a method of driving a converter circuit according to an embodiment.

FIG. 5 is a flowchart illustrating a method of driving a converter circuit according to an embodiment.

In operation S11, a conversion target signal for each interval is inputted to an input unit of the converter circuit.

In operation S12, a conversion target signal for each interval is detected. For example, one of a plurality of charge storage units constituting a detection unit may detect a signal for a corresponding interval by sampling it several times.

In operation S13, an average value of the several times sampled signals for each interval is calculated.

In operation S14, it is determined whether to detect another interval or not. For example, when sampling and calculating of an average value for one interval (i.e., interval 1) among two intervals are completed, a conversion target signal of another interval (i.e., interval 2) needs to be detected. In case the another interval be detected, the detecting of the signal in operation S12 and the calculating of the average value in operation S13 are repeated for the another interval.

In operation S15, an input signal is inputted to a comparison unit. The input signal inputted to the comparison unit may be dependable on an average value of conversion target signals for each interval, a ramp signal value, and a predetermined reference voltage signal value.

In operation S16, a comparison result value is outputted. For example, the comparison unit compares the input signal with the reference voltage signal Vref to output the comparison result value.

According to the above method, a converter circuit and a method of driving the same may be provided. Moreover, in order to describe the converter circuit in this specification, a conversion target signal, the number of detection intervals, and the number of samplings for a corresponding interval are specifically or typically described but the scope of the present invention is not limited thereto. Thus, the present invention may be applied to all converter circuits using at least one signal for each interval as a conversion target and all methods of driving the same.

According to an embodiment, a simple and reliable converter circuit is provided.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A converter circuit comprising:
an input unit receiving a conversion target signal from a pixel of an image sensor;
a detection unit receiving a conversion target signal for each of a plurality of converter circuit switching intervals from the input unit, sequentially sampling the conversion target signal for each switching interval according to a plurality of timings to obtain a corresponding plurality of samples, calculating an average value of the conversion target signal for each interval by averaging the plurality of samples, and outputting a comparison unit input signal corresponding to the average value of the conversion target signal for each switching interval; and
a comparison unit comparing the comparison unit input signal with a predetermined reference signal to output a comparison result value;
wherein the detection unit comprises of plurality of charge storage units detecting the conversion target signal for each switching interval; and
wherein each of the charge storage units comprises a plurality of charge storage devices and a plurality of switching devices and samples the conversion target signal for each switching interval by sequentially operating the plurality of charge storage devices according to the plurality of timings.

2. The converter circuit according to claim 1, wherein one of the plurality of charge storage units comprises a ramp generation unit for generating a ramp signal after a detection interval end of the detection unit; and
the comparison unit operates in synchronization to the ramp generation unit.

3. The converter circuit according to claim 2, wherein the comparison unit operates at a count interval; and
wherein the count interval between the generating of the ramp signal and a trip state of the comparison unit.

4. The converter circuit according to claim 2, wherein another of the plurality of charge storage units is located between the input unit and the comparison unit.

5. The converter circuit according to claim 1, wherein when the number of charge storage devices in one charge storage unit of the plurality of charge storage units is M, the number of samplings by the plurality of timings is M.

6. The converter circuit according to claim 1, wherein the input unit comprises a switching device.

7. The converter circuit according to claim 1, wherein an input signal of the comparison unit is proportional to the average value for each interval.

8. The converter circuit according to claim 1, wherein the conversion target signal for each interval comprises at least one of a reset output signal and a signal output signal of the pixel.

9. A method of driving a converter circuit, comprising:
receiving at an input unit of the converter circuit a conversion target signal from a pixel of an image sensor;
receiving from the input unit by a detection unit of the converter circuit the conversion target signal for each of a plurality of converter circuit switching intervals;
sequentially sampling the conversion target signal by the detection unit for each switching interval according to a plurality of timings to obtain a corresponding plurality of samples;
calculating by the detection unit an average value of the conversion target signal for each switching interval by averaging the plurality of samples;
inputting a comparison unit input signal corresponding to the average value of the conversion target signal for each switching interval into a comparison unit of the converter circuit; and
outputting a comparison result value by comparing the comparison unit input signal and a predetermined reference signal in the comparison unit;
wherein the converter circuit comprises a plurality of charge storage units detecting the conversion target signal for each switching interval;
wherein each of the charge storage units comprises a plurality of charge storage devices and a plurality of switching devices; and
wherein the sampling of the conversion target signal comprises sequentially operating the plurality of charge storage devices according to the plurality of timings.

10. The method according to claim 9, further comprising repeating the sampling of the conversion target signal and the calculating of the average value.

11. The method according to claim 9, wherein one of the plurality of charge storage units comprises a ramp generation unit for generating a ramp signal after a sampling interval end of the converter circuit, further comprising operating the comparison unit in synchronization to the ramp generation unit.

12. The method according to claim 11, further comprising operating the comparison unit during a count interval, wherein the count interval is between the generating of the ramp signal and a trip state of the comparison unit.

13. The method according to claim 11, wherein another of the plurality of charge storage units is disposed between the input unit and the comparison unit.

14. The method according to claim 9, wherein when the number of charge storage devices in the charge storage unit is M, the plurality of samplings by the plurality of timings is M.

15. The method according to claim 9, wherein the input unit comprises a switching device.

16. The method according to claim 9, wherein an input signal of the comparison unit is proportional to the average value for each interval.

17. The method according to claim 9, wherein the conversion target signal for each interval comprises at least one of a reset output signal and a signal output signal of the pixel.

* * * * *